US008245285B1

(12) United States Patent
Ravishankar et al.

(10) Patent No.: US 8,245,285 B1
(45) Date of Patent: Aug. 14, 2012

(54) TRANSPORT-LEVEL WEB APPLICATION SECURITY ON A RESOURCE-CONSTRAINED DEVICE

(75) Inventors: Tanjore S. Ravishankar, San Jose, CA (US); Thierry Violleau, Poissy (FR); Matthew R. Hill, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1042 days.

(21) Appl. No.: 11/525,978

(22) Filed: Sep. 22, 2006

(51) Int. Cl.
*H04L 29/06* (2006.01)
(52) U.S. Cl. .......................................................... 726/9
(58) Field of Classification Search .................. 709/203, 709/226, 229; 726/14–15; 713/151, 152, 713/162, 171, 173
See application file for complete search history.

(56) References Cited

U.S. PATENT DOCUMENTS

| | | | | |
|---|---|---|---|---|
| 6,005,942 A * | 12/1999 | Chan et al. | ..................... | 713/187 |
| 6,647,422 B2 * | 11/2003 | Wesinger et al. | ............ | 709/228 |
| 6,829,711 B1 * | 12/2004 | Kwok et al. | .................. | 713/183 |
| 2003/0086542 A1 * | 5/2003 | Urien | ........................ | 379/93.01 |
| 2005/0108571 A1 * | 5/2005 | Lu et al. | ........................ | 713/201 |
| 2005/0259673 A1 * | 11/2005 | Lu et al. | ........................ | 370/419 |
| 2006/0041938 A1 * | 2/2006 | Ali | ..................................... | 726/14 |
| 2006/0047954 A1 * | 3/2006 | Sachdeva et al. | ............. | 713/165 |
| 2006/0085848 A1 * | 4/2006 | Aissi et al. | ........................ | 726/9 |

OTHER PUBLICATIONS

RFC 1833, Binding Protocols for ONC RPC Version 2, Srinivasan, Aug. 1995.*

* cited by examiner

*Primary Examiner* — Gilberto Barron, Jr.
*Assistant Examiner* — Shaun Gregory
(74) *Attorney, Agent, or Firm* — Fliesler Meyer LLP

(57) ABSTRACT

A system and method is provided to facilitate secure communications for a server-application executing on a resource-constrained device. A request, from a client application executing on a client device to access a server application executing on the resource-constrained device is received on an application-specific secure port of a resource-constrained device. The request is authenticated using a security token stored in an application context of the server application. The authentication is performed by a transport security layer protocol executing within the application context of the server application. The security token is specific for the server application. A secure connection is established directly between the secure port and the client application upon the authentication being successful.

19 Claims, 4 Drawing Sheets

TRANSPORT-LEVEL WEB APPLICATION SECURITY ON A RESOURCE-CONSTRAINED DEVICE

BACKGROUND OF THE INVENTION

1. Field of the Invention

The present invention generally relates to server applications and more particularly to HTTP-servlet based applications for resource-constrained devices.

2. Description of the Related Art

Smart cards and other resource-constrained devices provide various services for users via small, easily portable devices. For example, a user inserts a smart card 100 into a card acceptance device 120 such as a bank terminal, which in turn communicates with a remote device 130 that is running a remote application 131. The user completes a banking transaction via smart card 100 and bank terminal 120, removes smart card 100 from bank terminal 120, and retains smart card 100 for future transactions.

To provide a variety of services via smart card 100, smart card 100 typically supports multiple on-card applications, of which banking application 110 is one example. On-card applications generally refer to applications executed on the smart card. On-card applications not only execute on the smart card, but also can interact with one another to provide various services. In some cases, the on-card applications further interact with off-card applications. Off-card applications generally refer to applications executing on a device other than smart card 100.

To provide on-card applications, developers build and test programs using standard software development tools and environments and convert the programs into a form that is installed on smart card 100. For example, Java Card™ technology enables programs written in the Java™ programming language to be installed and executed on a variety of smart cards and other resource-constrained devices. (Java™ and Java Card™ are trademarks of Sun Microsystems, Inc., of Santa Clara, Calif., U.S.)

To protect the services enabled by smart cards, the programs and operations underlying the transactions have associated security mechanisms such as firewalls that prevent one on-card application from accessing information in a context of another on-card application. Firewalls ensure that one application cannot access the data or code of another application unless that application has provided an interface for access, such as a shareable object interface.

The limited resources available on smart card 100 cannot support more generalized approaches for communications between each of the multiple applications or some subset of the multiple applications typically found on smart card 100. Also, in view of the limited resources available, authentication of each off-card client and/or each on-card application service is problematic.

Security of the operations underlying the services also raises issues. In the example of FIG. 1, a proxy 121 is used on-card acceptance device 120 because one communication protocol is used to communicate between remote application 131 and proxy 121 and a different communication protocol is used to communicate between proxy 121 and on-card application 110, sometimes referred to simply as application 110.

Since an end-to-end communication path, i.e., a direct path between remote application 131 and application 110 cannot be established, proxy 121 must decrypt any encrypted information from remote application 131 and re-encrypt the information for transmission to application 110. Similarly, encrypted information from application 110 must be decrypted by proxy 121 and re-encrypted for transmission to remote application 131. This means that there is the potential for sensitive information to be accessible, e.g., in the open, on-card acceptance device 120, which is a significant security issue.

Various security mechanisms are sometimes employed in an attempt to address this security issue. One example is hypertext transfer protocol over Secure Sockets Layer (HTTPS). HTTPS is a scheme that uses the hypertext transfer protocol (HTTP) requests and the additional security measures of the Secure Sockets Layer (SSL) protocol. SSL provides communication endpoint authentication and communication privacy between the server and its clients using cryptography.

Unfortunately, HTTPS is typically used for server authentication to the clients of the server—the clients typically remain unauthenticated. Thus, when a smart card functions as a server, HTTPS provides generic authentication at the server level, i.e., the card application container level.

However, smart card 100 typically includes multiple applications. The applications may be deployed onto the card from different issuers. Each issuer typically requires a level of security specific to the associated application. Further, each issuer determines a set of trusted client applications with which the associated application is authorized to communicate.

Thus, generic authentication of a client application at the card level or the container level is not sufficient, i.e., authentication by the resource-constrained device or by a container managing multiple applications on the resource-constrained device is not sufficient. Each client application must be authenticated at the application level, i.e., verification of authorization for each client application to communicate with the targeted on-card application.

In addition to the foregoing issues, virtual hosting that is utilized with Web-servers presents another issue if it is attempted to extend virtual hosting to smart card 100. Virtual hosting generally refers to the practice of maintaining more than one virtual host, or website, on a single device. Each virtual host is associated with a collection of server applications deployed on that Web-server. Security mechanisms such as HTTPS are sometimes used for client authentication by the virtual host, i.e., each virtual host authenticates each client application with which it communicates.

In cases of client authentication on a per-virtual host basis, however, a virtual host must be manually configured for each server application deployed, resulting in cumbersome efforts with respect to smart card 100. Further, to communicate via the virtual hosts, each client must know the specific port, the domain name, or the IP address of the virtual host associated with the targeted server application. All of these issues make the use of virtual hosts problematic on smart card 100.

In view of the multitude of clients potentially communicating with multiple server applications of various virtual hosts, HTTPS communications quickly become difficult to implement as a comprehensive security solution. As can be seen, the foregoing issues render the implementation of secure transactions and communications associated with a resource-constrained device cumbersome and inflexible.

SUMMARY OF THE INVENTION

The prior art issues associated with security, inflexibility, and inefficiency of communications with applications executing on resource-constrained devices are eliminated by one embodiment of this invention. Common communication protocols facilitate expanded and secure communications for applications executing on the resource-constrained device.

In one embodiment, a method, which is implemented in a resource-constrained device having a server application executing within an application context on the resource-constrained device, includes receiving a request, from a client application executing on a client device, to access the server application executing on the resource-constrained device. The request is received on an application-specific secure port of the resource-constrained device.

In this method, the request is authenticated using a security token stored in the application context of the server application on the resource-constrained device. This authentication is performed by a transport security layer protocol executing within the application context of the server application. The security token is specific to the server-application. The method establishes a secure connection directly between the secure port and the client application upon the authentication being successful.

The method also includes allocating dynamically the application-specific secure port on deployment of the server application on the resource-constrained device and spawning a new port listener that listens on the application-specific secure port.

In embodiment, prior to receiving the request on the application-specific secure port of the resource-constrained device, the method includes receiving, on a default port of the resource-constrained device, a request, from the client application executing on the client device, to access the server application executing on the resource-constrained device. This request is rebuilt to include an identifier of the application-specific secure port and then the client application is redirected to the secure application specific port.

In one embodiment, the transport security layer implements a secure sockets layer (SSL) protocol. In another embodiment, the transport security layer implements a transport layer security (TLS) protocol.

Also, in another embodiment, instead of sending the request to the default port, the client application sends a uniform resource locator to the default port that determines, from a redirection map, the port identifier for the application-specific secure port. Using this information, the client application sends a request directly to the application-secure port and so eliminates the requirements for rebuilding and redirection.

The method also includes in one embodiment deploying an application bundle onto the resource-constrained device. The application bundle includes: the server application; at least one security token, such as a trusted client public key certificate, for deployment in the application context of the server application; and another security token, such as a private key, for the server application.

A resource-constrained device includes a default port; an application context; at least one server application executing in the application context; a secure port for the server application; and a secure port redirector coupled to the default port. The secure port redirector listens on the default port for at least a request directed to the at least one server application and rebuilds the request to form a rebuilt request including an identifier for the secure port.

The resource-constrained device also includes a transport security layer. Upon accepting a connection on the secure port (of the server application) for the rebuilt request, the transport security layer authenticates the client application that initiated the secure connection. Upon successful authentication of the client application, the secure connection is established and the client application sends the request, which gets dispatched to the server application.

The resource-constrained device also includes a trust store object stored in the application context. The trust store object includes a security token for the client application and the security token is used in the authentication.

The resource-constrained device further includes a key store object stored in the application context. The key store object includes a security token for the server application.

A redirection map is coupled to the secure port redirector and includes at least one entry including an application identifier identifying the server application and a port identifier identifying the application-specific secure port.

A computer product has embedded therein computer-readable instructions wherein execution of the computer-readable instructions on a resource-constrained device generates a method comprising:

receiving, on an application-specific secure port of a resource-constrained device, a request, from a client application executing on a client device, to access the server application executing on the resource-constrained device;

authenticating the request, using a security token stored in an application context of the server application on the resource-constrained device, by a transport security layer protocol executing within the application context of the server application wherein the security token for the server-application; and establishing a secure connection directly between the secure port and the client application upon the authenticating being successful.

BRIEF DESCRIPTION OF THE DRAWINGS

Common reference numerals are used throughout the drawings and detailed description to indicate like elements. Also, the first digit in a reference numeral indicates the figure number of the figure in which the corresponding element first appeared.

Glossary of Terms

Figure 1:
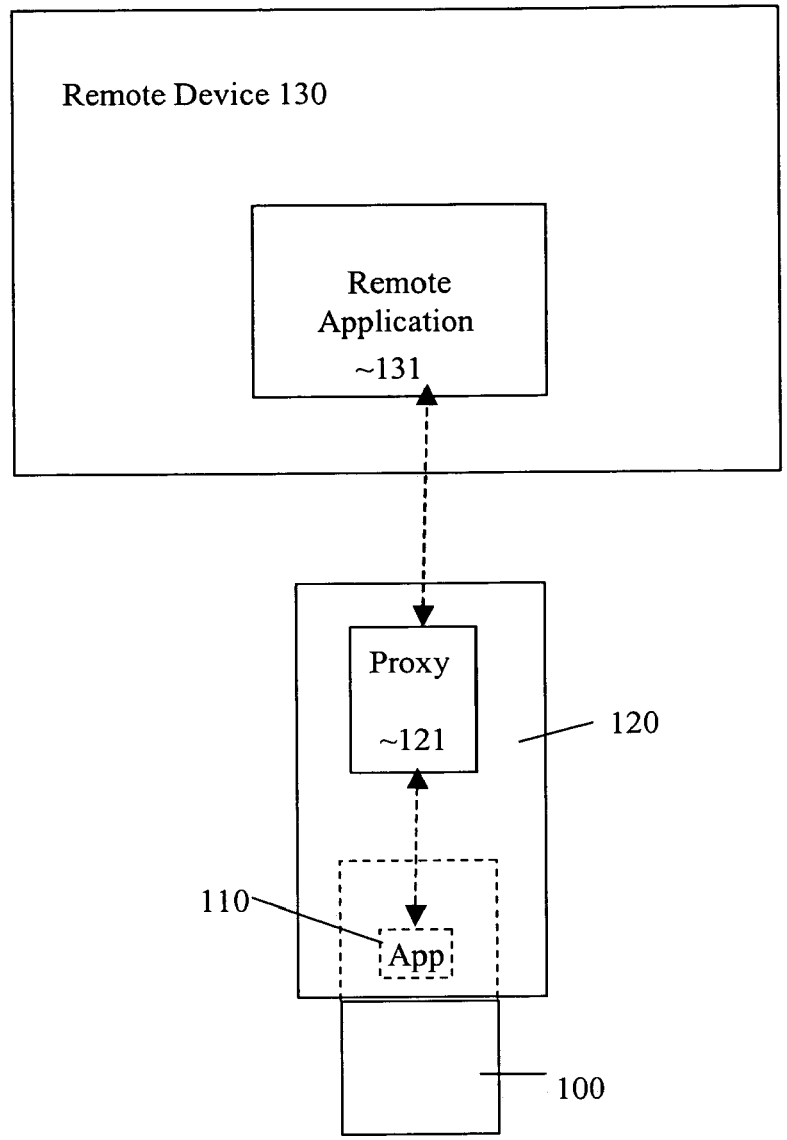
FIG. 1 illustrates a smart card communication environment of the prior art.
Figure 2:
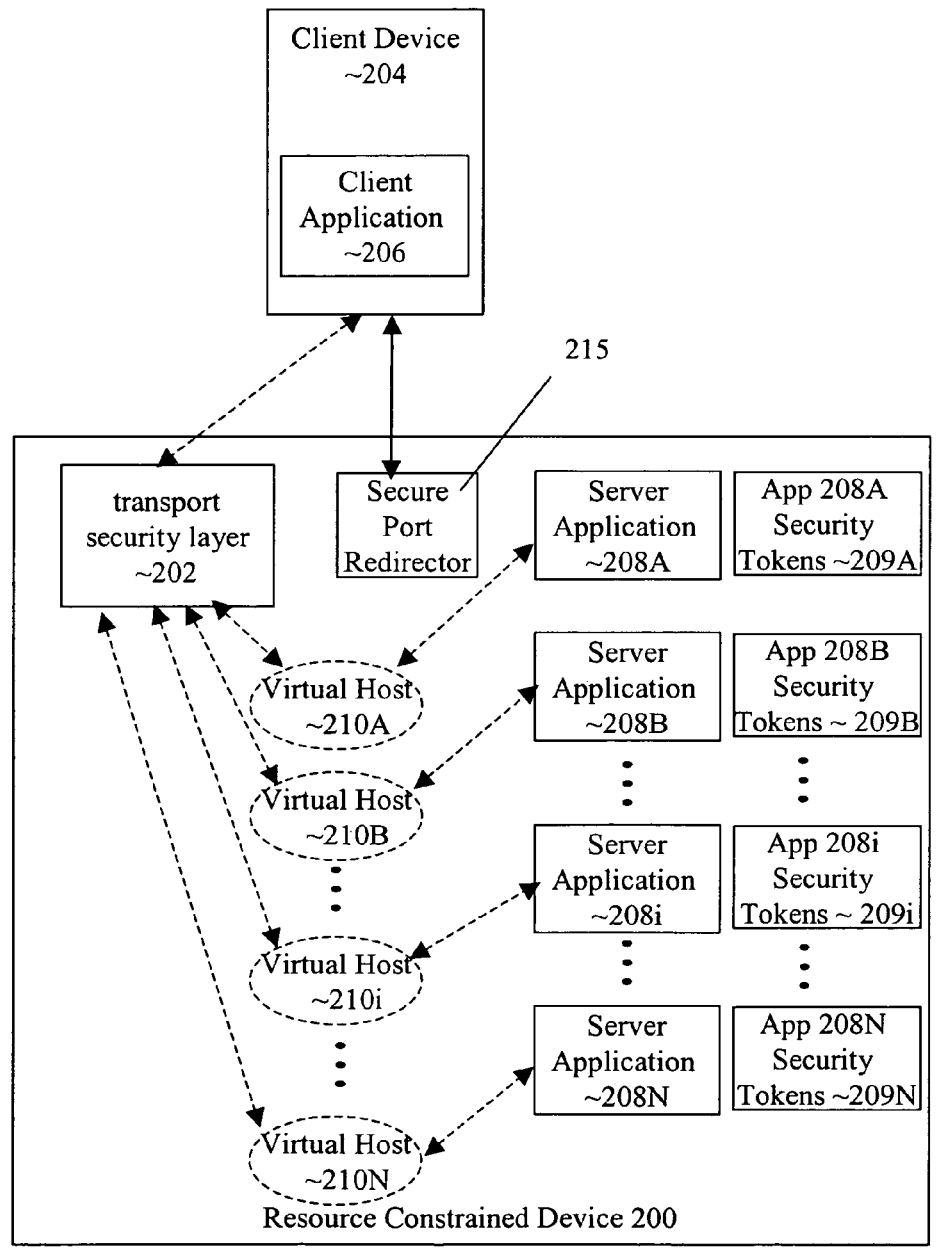
FIG. 2 illustrates a resource-constrained device including application-specific secure connections, according to one embodiment of the present invention.

As used in the following detailed description, JDK refers Java™ Platform Standard Edition 5.0 Development Kit, available from Sun Microsystems, Inc. of Santa Clara, Calif., USA. JDK includes the Java™ Platform Standard Edition Runtime Environment (JRE) plus command-line development tools such as compilers and debuggers that are necessary or useful for developing applets and applications. The JRE provides the libraries, Java™ virtual machine, and other components necessary to run applets and applications written in the Java™ programming language. The runtime environment can be redistributed with applications to make them freestanding.

As used in the following detailed description, HTTP stands for Hypertext Transfer Protocol. The Hypertext Transfer Protocol (HTTP) is an application-level protocol for distributed, collaborative, hypermedia information systems. HTTP is a generic, stateless, protocol. A feature of HTTP is the typing and negotiation of data representation, allowing systems to be built independently of the data being transferred. A more detailed description of the HTTP is given in A. R. Fielding et al., "Hypertext Transfer Protocol—HTTP.1.1," Network Working Group, Request for Comments: 2616, June 1999, and J. Franks et al., "HTTP Authentication: Basic and Digest Access Authentication," Network Working Group, Request for Comments: 2617, June 1999, both of which are incorporated herein by reference in their entireties to demonstrate the knowledge of one skilled in the art.

As used in the following detailed description, Secure Sockets Layer (SSL) implements the secure sockets layer protocol. The SSL protocol is composed of two layers. At the lowest level, layered on top of some reliable transport protocol (e.g., TCP), is the SSL Record Protocol. The SSL Record Protocol is used for encapsulation of various higher-level protocols. One such encapsulated protocol, the SSL Handshake Protocol, allows the server and client to authenticate each other and to negotiate an encryption algorithm and cryptographic keys before the application protocol transmits or receives its first byte of data. The SSL protocol is application protocol independent. A higher-level protocol, such as HTTP, can layer on top of the SSL Protocol transparently. The SSL protocol provides connection security that has three basic properties:
  a) The connection is private. Encryption is used after an initial handshake to define a secret key. Symmetric cryptography is used for data encryption (e.g., DES, RC4, etc.);
  b) The peer's identity can be authenticated using asymmetric, or public key, cryptography (e.g., RSA, DSS, etc.); and
  c) The connection is reliable. Message transport includes a message integrity check using a keyed MAC. Secure hash functions (e.g., SHA, MD5, etc.) are used for MAC.

A more detailed description of the SSL protocol is given in A. Freier, Philip Karlton, Paul C. Kocher, "The SSL Protocol, Version 3.0," Transport Layer Security Working Group, INTERNET-DRAFT, Netscape Communications, Nov. 18, 1996, which is incorporated herein by reference in its entirety to demonstrate the knowledge of one skilled in the art.

As used in the following detailed description, Transport Layer Security (TLS) implements the transport layer security protocol. The TLS protocol is composed of two layers: the TLS Record Protocol and the TLS Handshake Protocol. At the lowest level, layered on top of some reliable transport protocol (e.g., TCP), is the TLS Record Protocol. The TLS Record Protocol provides connection security that has two basic properties:
  i) The connection is private. Symmetric cryptography is used for data encryption (e.g., DES, RC4 etc.). The keys for this symmetric encryption are generated uniquely for each connection and are based on a secret negotiated by another protocol (such as the TLS Handshake Protocol). The Record Protocol can also be used without encryption; and
  (ii) The connection is reliable. Message transport includes a message integrity check using a keyed MAC. Secure hash functions (e.g., SHA, MD5, etc.) are used for MAC computations. The Record Protocol can operate without a MAC, but is generally only used in this mode while another protocol is using the Record Protocol as a transport for negotiating security parameters.

The TLS Record Protocol is used for encapsulation of various higher-level protocols. One such encapsulated protocol, the TLS Handshake Protocol, allows the server and client to authenticate each other and to negotiate an encryption algorithm and cryptographic keys before the application protocol transmits or receives its first byte of data. The TLS Handshake Protocol provides connection security that has three basic properties:
  a) The peer's identity can be authenticated using for example asymmetric, or public key, cryptography (e.g., RSA, DSS, etc.). This authentication can be made optional, but is generally required for at least one of the peers;
  b) The negotiation of a shared secret is secure: the negotiated secret is unavailable to eavesdroppers, and for any authenticated connection the secret cannot be obtained, even by an attacker who can place himself in the middle of the connection; and
  c) The negotiation is reliable: no attacker can modify the negotiation communication without being detected by the parties to the communication.

One advantage of TLS is that it is application protocol independent. Higher-level protocols, such as HTTP, can layer on top of the TLS Protocol. A more detailed description of the TLS protocol is given in T. Dierks and E. Rescorla, "The Transport Layer Security (TLS) Protocol, Version 1.1", Network Working Group, Request for Comments: 4346, April 2006, which is incorporated herein by reference in its entirety to demonstrate the knowledge of one skilled in the art.

As used herein, HTTPS stands for Hypertext Transfer Protocol over a Secure Socket Layer, or over a Transport Security Layer. HTTPS is a protocol that was developed by Netscape. HTTPS is the use of either the Secure Socket Layer or the Transport Security Layer as a sub-layer under the regular HTTP application layer. See for example, E. Rescorla, "HTTP Over TLS," Network Working Group, Request for Comments: 2818, May 2000, which is incorporated herein by reference in its entirety to demonstrate the knowledge of one skilled in the art.

As used in the following detailed description, an interface is a named collection of method definitions and defines a protocol of behavior that can be implemented by any class in the class hierarchy. An interface defines a set of methods but does not implement them.

As used in the following detailed description, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described herein.

As used in the following detailed description, resource-constrained devices include devices having limited resources and/or limited resource capacity. Resources include processors and memory. One example of a resource-constrained device is a smart card, sometimes referred to as a card, having limited processing capacity and limited memory resources. One example of a smart card is a secure portable device such as a Java Card™ technology-enabled device, or the like. Java Card™ technology is described in Chen, Z., Java Card™ Technology for Smart Cards—Architecture and Programmer's Guide, Boston, Addison-Wesley, 2000. (Java Card™ is a trademark of Sun Microsystems, Inc., Santa Clara, Calif., U.S.)

As used in the following detailed description, client devices are computer devices and other devices with a processor and memory, other than a particular resource-constrained device, capable of direct and/or indirect interaction with the resource-constrained device.

As used in the following detailed description, a resource-constrained device may support a multi-application environment, i.e., multiple applications coexist on the resource-constrained device. One example of a multi-application environment is a Java Card™ Runtime Environment (JCRE). The JCRE is a computing environment, or platform, from Sun Microsystems that can run applications developed using the Java™ programming language and sets of development tools. The JCRE includes one or more JCRE contexts.

As used in the following detailed description, a JCRE context is a system context that manages card resources—processor, memory, I/O interfaces and other system resources. Application containers execute in a JCRE context.

As used in the following detailed description, a container manages application contexts and application lifecycle.

As used in the following detailed description, an application context includes one or more executing applications.

As used in the following detailed description, an application includes, for example, web applications, e.g., applications servicing requests over the HTTP protocol, and applet applications, i.e., applications servicing requests over the 1S07816 APDU protocol. Web applications include at least one servlet. Applet applications include at least one applet.

As used in the following detailed description, a servlet is a program that when executed generates dynamic content and interacts with off-card web clients using a request-response paradigm. Servlets can also interact with other on-card applications. Servlets execute on a computer device such as a resource-constrained device.

As used in the following detailed description, an applet is a program that when executed interacts with off-card APDU clients using a request-response paradigm. Applets can also interact with other on-card applications. Applets execute on a computer device such as a resource-constrained device.

As used in the following detailed description, an object is an instantiation of an object-oriented computer program language entity, such as a class.

DETAILED DESCRIPTION

According to one embodiment of the invention, the prior art problems associated with virtual hosts on a resource-constrained device have been overcome. Each on-card application 208$i$, where i ranges from A to N, deployed on resource-constrained device 200 owns and controls security tokens 209$i$ that are protected from each of the other on-card applications deployed on resource-constrained device 200. In one embodiment, each on-card application or group of on-card applications along with the security tokens for the applications are contained within the boundary of a firewall that prevents the other on-card applications from accessing the security tokens.

Security tokens 209$i$ are used with transport security layer 202 to authenticate requests from an off-card application 206, executing on a remote device 204, and to encrypt and decrypt data exchanged with off-card application 206. Since security tokens 209$i$ are exclusive to application 208$i$, on-card application 208$i$ can rely on transport security layer 202 as a transport security layer for on-card application 208$i$ so long as transport security layer 202 is executing within the boundaries of the firewall protecting on-card application 208$i$.

In one embodiment, off-card application 206 is a client application; remote device 204 is a client device; and on-card application 208$i$ is a server application. Also, herein, transport security layer 202 is a generic security layer and can be for example either a Secure Sockets Layer or a Transport Layer Security.

The establishment of a secure connection between on-card application 208$i$ and off-card application 206 permits secure direct transactions between application 208$i$ executing on resource-constrained device 200 and off-card application 206 executing on client device 204. The dependency on a proxy in an intermediate device to translate between protocols and to unwrap information before providing that information to an application executing on resource-constrained device 200 has been eliminated. Further, the secure connection is established on a per-application basis, in this embodiment, without requiring any special processing to be performed by either client device 204 or off-card application 206.

Initially, in this embodiment, to establish a communication link with on-card application 208$i$, off-card application 206 accesses a default port of resource-constrained device 200 with a request directed to on-card application 208$i$. Secure port redirector 215 listens on the default port and when the request is received for application 208$i$, secure port redirector 215 redirects application 206 to the correct application-specific secure port for application 208$i$. Virtual host 210$i$ is listening on that application-specific secure port for requests directed to application 208$i$. The redirection by secure port redirector 215 allows port-based virtual hosting to seamlessly provide security services on a per-server application basis on resource-constrained device 200 without requiring any special processing to be performed by either client device 204 or off-card application 206.

In this embodiment, redirects and dynamic port allocation are used instead of static port assignment and direct port addressing to ensure interoperability of server applications on different resource-constrained devices. As explained more completely below, interoperability is achieved by the use of application specific uniform resource identifiers to avoid deployment conflicts. There is no need for TCP/IP port number standardization. Thus, neither the card issuer nor the application provider needs to perform special steps during deployment. The application-specific secure port for an application on resource-constrained device is dynamically allocated at the time of deployment of the application. Thus, the same application on two different resource-constrained devices can be associated with a different application-specific secure port on each of the devices.

Figure 3:
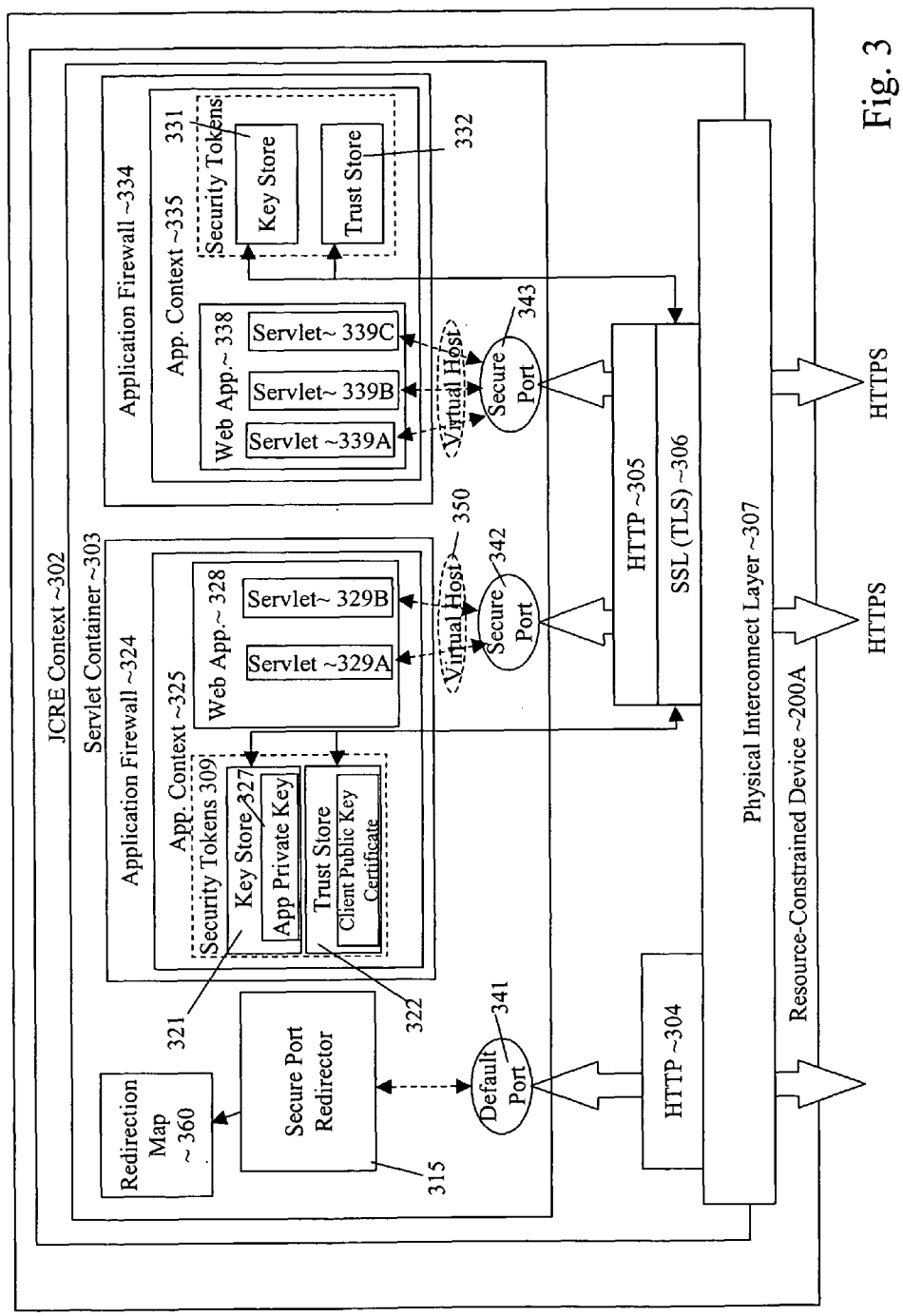
FIG. 3 illustrates a more detailed embodiment of the resource-constrained device of FIG. 2, according to one embodiment of the present invention.

FIG. 3 is a more detailed block diagram of a resource-constrained device 200A, which is one embodiment of resource-constrained device 200. In FIG. 3, a multi-application environment Java Card™ Runtime Environment (JCRE) is providing a JCRE context 302, which is a system context that manages one or more containers, e.g., servlet container 303, which is executing on resource-constrained device 200A. The use of servlet container 303 is illustrative only and is not intended to limit the invention to this embodiment. In view of this disclosure, one of skill in the art can implement a multi-application environment on a resource-constrained device that supports server applications.

Servlet container 303 further includes two web applications 328 and 338 that are each executing in a different application context 325 and 335, respectively. Web applications 328 and 338 are examples of server applications.

Each of web applications 328 and 338 is secured by its own application firewall 324, 334, respectively. Again, the use of two web-applications executing in different contexts is illustrative only and is not intended to limit the invention to this specific embodiment. Also, the use of web-applications is an illustration of server applications on a resource-constrained device.

Web application 328 includes HTTP servlets 329A and 329B, while web application 338 includes HTTP servlets 339A, 339B, and 339C. In this embodiment, each of the HTTP servlets handles HTTP POST and GET requests, retrieves HTTP request parameters, and generates XML or other text-structured data.

One embodiment of an implementation of a servlet container and a web application is described in copending, commonly filed, and commonly assigned U.S. patent application Ser. No. 11/454,483, entitled "Persistence System for Servlet-based Applications on Resource-Constrained Devices" of Thierry Violleau, Tanjore S. Ravishankar, Sebastian Jurgen Hans, and Matthew R. Hill, filed on Jun. 16, 2006, which is incorporated herein by reference in its entirety.

Isolation of application execution contexts 325 and 335 means that an application, e.g., web application 328, executing in one context cannot access objects of another application executing in another context, e.g., web application 338, unless the other application explicitly provides an interface for access. Isolation is typically enforced via firewalls 324, 334 at the application context level. In this embodiment, firewalls 324, 334 permit access between applications 328, 338 only via specially designated interfaces.

In the example of FIG. 3, security tokens 309 are implemented using a key store 321 and a trust store 322. Key store 321 and trust store 322 are within application context 325 that is protected by application firewall 324. Key store 321 and trust store 322 and any objects contained in these stores cannot be accessed by any application on resource-constrained device 200A other than web application 328 and the transport security layer while executing in application context 325.

Similarly, key store 331 and trust store 332 are within application context 335 that is protected by application firewall 334. Key store 331 and trust store 332 and any objects contained in these stores cannot be accessed by any application on resource-constrained device 200A other than web application 338 and the transport security layer while executing in application context 335.

Key store 321 includes at least one security token such as a server-application private key 327. Server-application private key 327 is issued to web application 328 and not to resource-constrained device 200A. In one embodiment, key store 321 also includes another security token such as a server-application digital certificate, e.g., the public key certificate corresponding to server-application private key 327. This public key certificate is sometimes referred to as a server-application public key certificate.

Trust store 322 contains security tokens such as public key certificates for trusted client applications that can access web application 328. Only client applications with a public key certificate in trust store 322 can successfully communicate with web application 328.

Secure port redirector 315, executing in servlet container 303, listens on default port 341 in servlet container 303 for HTTP and/or HTTPS requests to access either of web applications 328 and 338. In response to an initial request for communication from a client application directed to web application 328 via default port 341, secure port redirector 315 rebuilds the requested uniform resource locator (URL) to include an identifier for application-specific secure port 342 for web application 328. In rebuilding the URL, secure port redirector 315 accesses a redirection map 360 to determine the identifier for the application-specific secure port, i.e., an identifier for secure port 342, associated with web application 328.

For example, assume that virtual host 350 for application 328 is listening on application-specific secure port 342 that is "port 30000." Also, assume secure port redirector 315 receives the following HTTP request from client application 206 via HTTP layer 304 that is operating on top of a transport protocol (not shown) and physical interconnect layer 307:

http://<card_ip_address>/purse/debit.

Secure port redirector 315, following receipt of this request, accesses redirection map 360 and determines that port 30000 is the appropriate application-specific secure port for application "/purse" in this request and so "30000" is the application-specific secure port identifier. Hence, the rebuilt URL is:

https://<card_ip_address>:30000/purse/debit.

Secure port redirector 315 performs the redirection, for example, by an HTTP redirect, e.g., error code 3xx. The HTTP redirect could be HTTP response code |301 Moved Permanently|—if the port assignment is persistent across resource-constrained device sessions; or |307 Temporary Redirect|—if the port assignment is not persistent across resource-constrained device sessions. Thus, in this embodiment, secure port redirector 315 forwards the rebuilt request to the sender of the initial request, e.g., the client application.

In requesting access to a server application on resource-constrained device 200A, the initial connection is established with a default port associated with servlet container 303 and not with the particular server application even though the request was directed to the server application. The default port can be both unsecure or secure. If the first connection is secure, i.e., HTTPS is used. A secure sockets handshake using the secure sockets protocol executing in servlet container 303 is used to authenticate the communication endpoint(s) and to negotiate security parameters for communications. In this embodiment, to authenticate resource-constrained device 200A, a public key certificate for resource-constrained device 200A is used. This certificate can be the same for every issued resource-constrained device within a controlled deployment base managed by the card issuer.

Upon receiving the rebuilt URL, in one embodiment, the client application, or perhaps an interface associated with an operating system executing on resource-constrained device 200A, forwards the rebuilt request back to application-specific secure port 342 of resource-constrained device 200A. In this manner, client devices and their associated client applications are relieved of the burden of having to know each application-specific secure port assigned to each on-card application on the resource-constrained device to initiate communication with on-card applications.

Upon accepting a connection to application-specific secure port 342, secure sockets layer 306, executing in application context 325, performs a SSL handshake to authenticate the communication endpoint(s) and to negotiate security parameters for the connection between client application 206 and web application 328. If the authentication of the endpoints fails, a secure connection to application-specific secure port 342 is not established. Note that in one embodiment at least client application 206 is authenticated. Web application 328 may not be authenticated by client application 206. Herein, when it is stated that client application 206 performs an authentication, those of skill in the art will understand that SSL associated with the HTTPS request from client application 206 actually performs the authentication.

If client-application 206 has a client public key certificate in trust store 322 so that client-application 206 is authenticated, data is encrypted and decrypted by SSL 306 using the private key for application 328 in key store 321. Thus, session data are processed through an HTTPS layer to facilitate delivery to and from application 206 over the secure application-specific connection. Specifically, virtual host 350 that is listening on the application-specific secure port 342 receives notification of the data, and forwards the data to the appropriate servlet in application 328.

Thus, security is provided on a per-application basis. As explained more completely below, in one embodiment, security parameters can be configured declaratively in the deployment descriptor of the on-card application. Digital certificates can be provided at deployment time of the on-card application. In this manner, multiple on-card applications of a resource-constrained device can securely and successfully communicate with a variety of applications residing on various devices using SSL or TLS 306.

As noted above, SSL processing must be within application security boundaries (security context) so that any decrypted info, digital certificate access, etc. is protected from other applications. The other layers on the network protocol stack below SSL 306 must not be within application security boundaries. Note that in the case of a split protocol stack, the TCP/IP stack is off resource-constrained device 200A, but SSL 306 must still be on-resource-constrained device 200A.

Herein, HTTP 304 and HTTP 305 can be the same entity. They are illustrated as being different in FIG. 3 for convenience and ease of understanding.

Compared to the prior art port-based virtual hosting solution, this solution allows for transparent deployment and management of applications on dedicated virtual hosts on resource-constrained device 200A. Both deployers/issuers and users do not have to know or handle in any particular way the deployment and the addressing of applications on resource-constrained device 200A.

In one embodiment, this solution specifies a new packaging of applications. An application is bundled with its own server application public key certificate and private key as well as public key certificates of trusted clients. These keys and digital certificates are secured in the private key store and trust store that are not exposed to other applications in different contexts. When the corresponding application is undeployed, these stores are undeployed along with their application.

The HTTP redirect, described above, is part of the HTTP protocol and is supported by Java™ Platform Standard Edition 5.0 Development Kit, available from Sun Microsystems, Inc. of Santa Clara, Calif., USA. The JDK application-programming interface (API) allows a client application to configure its connections so that HTTP redirects are transparently handled hence necessitating no modification to the client application code to handle the redirects described herein.

As described above if a client application sends a request that includes the URL http://<card_ip_address>/purse/debit, the client application receives a response to the rebuilt request https://<card_ip_address>:30000/purse/debit—since the API transparently handled the HTTP redirect. This allows for a seamless end-to-end Java™ architecture based on this solution.

For client applications using an API that does not transparently handle HTTP redirects, the programmers will have to configure the client application to process the response to the initial request and reissue a request to the rebuilt URL specified in the response. This rebuilt URL can be used as the base URL for subsequent requests hence avoiding HTTP redirections. Note that this is also applicable to all application clients, which want to minimize the network overhead induced by redirections.

In an alternative embodiment, a complementary service is provided for network-traffic-conscious client applications. Such client applications are given access to redirection map 360 via a dedicated URL. A client application may then choose to query this URL for the application-specific secure port assigned to a secure server application to avoid the HTTP redirection. The equivalent behavior can be obtained in the client application by handling manually the very first HTTP redirection and rewriting subsequent requests accordingly.

The above description assumed that resource-constrained device 200A had a server certificate assigned to the device itself. Thus, client application 206 using SSL could authenticate resource-constrained device itself.

In certain cases, a hostname mismatch may occur during the authentication of resource-constrained device 200A by client application 206. A hostname mismatch means that the server certificate verification, i.e., authentication of the server/resource-constrained device by the client application, fails because the hostname of the resource-constrained device to which the client application is attempting to connect does not match the domain name in the server certificate/card-specific certificate. A hostname mismatch may result in, for example, a dialog warning on a browser that indicates a hostname mismatch.

Cases of hostname mismatch include, for example, situations where the resource-constrained device does not have a static IP address or a fully-qualified hostname (hence, no domain name), and cases where the server certificate has not been issued to a particular resource-constrained device, but rather to an application deployed on many such devices. In the latter case, the application is not associated with any particular host.

Note that client applications may also use application programming interfaces, e.g., the Java™ SE Version 5.0 API, which allows for specifying a custom host verifier that disregards hostname mismatches, therefore ensuring that authentication succeeds. This hostname mismatch is not specific to the use of SSL with application specific certificates. Any use of SSL is subject to same problem when resource-constrained devices are mobile/nomad devices that may not have a fixed domain name.

Nevertheless, if the resource-constrained devices are smart cards issued to phone users by an operator, the operator can assign a fixed fully qualified hostname (either with a static IP address+DNS or dynamic IP address+Dynamic DNS) because the cards are used on the operator's network. In this case there is not an issue with mismatches.

At provisioning/deployment-time, the application must be installed with a card-specific certificate that has been issued to the smart card and contains its hostname. In this case, the client application (operator service) connecting to the smart cards may not have all the card application certificates in its trust store but may require that the smart card sends its public key certificate during the SSL handshake. The application client then checks that the fully qualified hostname for the device connected to the client application matches the one the certificate was issued to.

In a case where there is no fixed, fully-qualified-hostname assigned to the resource-constrained-device, the client application is still able to ensure a connection to a trusted on-card application of the resource-constrained device, since the on-card application was deployed with its server-application public key certificate and server-application private key and has a trusted-client certificate for the client application. The client application is not able to identify a particular smart card among all the smart cards on which the on-card application has been deployed.

One skilled in the art will recognize that various schemes may be employed to address various situations or objectives related to addressing/authentication of resource-constrained devices, such as smart cards and on-card applications. One such scheme, for example, includes the use of mobile IP, an Internet Engineering Task Force (IETF) standard communications protocol that is designed to allow mobile/nomad devices to be moved from one network to another while maintaining their respective permanent IP addresses.

Thus, if a resource-constrained device such as a smart card has a fixed, fully-qualified hostname and the on-card application has been provisioned with a card-specific certificate having a generic application certificate as its root, the client application and the on-card application of the smart card can mutually authenticate and the smart card itself is authenticated. The root generic application certificate can allow the client application to authenticate the on-card application when the client application does not have the card-specific certificate of the smart card in its trust store.

If the resource-constrained device such as a smart card does not have a fixed, fully-qualified hostname and the on-card application has been provisioned with a generic certificate, e.g., a server application public key certificate specific to the on-card application, the client application and the on-card application can mutually authenticate, even if the smart card itself cannot be authenticated by the client application.

Note that one feature of the redirection from the generic port to the application-specific secure port is that the client application can authenticate the smart card (if, for example, the smart card were issued with a card-specific certificate) prior to authenticating the on-card application. In this embodiment, if the smart card cannot be authenticated, there is no need to access the on-card application, thus conserving effort and resources.

Employment of a scheme utilizing dynamic port allocation and redirection of HTTP(S) requests to a dynamically-allocated port, e.g., an application-specific secure port, also avoids deployment conflicts without having to resort to traditional methods of avoidance, e.g., port standardization and use of multiple identifiers.

For example, various per-application static port and direct addressing schemes rely on port standardization, in addition to use of uniform resource identifiers (URIs) and other identifiers such as Applet Identifiers (AIDs), to avoid deployment conflicts. Port standardization, e.g., standardized TCP/IP port use, is managed by Internet Assigned Numbers Authority (IRNA). Thus, reliance on port standardization as a remedy to deployment conflicts not only reserves ports that may not be used, thus wasting resources, but also relies on a third-party port standardization service, e.g., IANA, thus building in another layer of complexity.

In addition to the foregoing, one embodiment also specifies a new deployment packaging of on-card applications. For example, an on-card application is bundled with its own server application public key certificate and private key as well as trusted clients' public key certificates. These keys and certificates are secured in a private key store and a private trust store that are not exposed to other application code, as previously discussed. When undeployed, the keystore and truststore are destroyed along with the associated application.

One embodiment of the present invention provides for transparent deployment and management of on-card applications on resource-constrained devices. Neither the deployers nor the issuers and users of resource-constrained devices need to know or handle in any particular way the deployment and addressing of applications.

In one embodiment, an application bundle such as a signed application bundle is used to deploy on-card application(s) and associated trusted client public certificates to the resource-constrained device. A signed application bundle includes an application and associated security tokens, in this embodiment. The bundle is signed to assert that all, or a part, of the included code is trusted. One example of a signed application bundle is a web application archive (WAR).

In one embodiment of the invention, the bundle includes an on-card application, e.g., server application, and trusted client public key certificates associated with the on-card application. As previously discussed, the trusted client public key certificates facilitate authentication of clients to the server application as well as encryption/decryption of communications between client applications and the on-card application.

In another embodiment, the bundle optionally includes a server-application private key and the corresponding server-application public key certificate that have been assigned to the application. The private key and the corresponding public key certificate are generic or randomly generated, and are not specifically assigned to the resource-constrained device. This means that the private key and the public key certificate do not contain a proper, fully qualified hostname specific to the resource-constrained device.

To avoid a hostname mismatch, the bundle optionally includes an additional (or overriding) host private key and corresponding host public key certificate for the resource-constrained device itself. The host private key and the corresponding host public key certificate are specific to the resource-constrained device, i.e., contain a proper, fully qualified hostname specific to the resource-constrained device. The bundle also optionally includes extra trusted client certificates. These security tokens, i.e., the tokens for the resource-constrained device itself and extra trusted client certificates, are specified via additional deployment parameters, i.e., these security tokens are not inserted in the signed application bundle so as not to alter the signed bundle.

In one embodiment, the deployment operation is modeled as:
  deploy(signedAppBundle
  [, hostPrivateKey[,hostPublicKeyCertificate]]
  [, trustedClientPublicKeyCertificates])
where hostPrivateKey and hostPublicKeyCertificate are for the resource-constrained device itself.

When loading the on-card application and creating the application context and the application root object, e.g., ServletContext, the servlet container creates the key store, i.e., the key store objects, and the trust store, i.e., the trust store objects. The key store objects include, for example, a private key and public key certificate for the application. The trust store objects include, for example, one or more trusted client public key certificates for client applications.

As explained above, the key store objects and trust store objects are each implemented within the firewall-enforced security boundaries of the application context of the associated application. In one embodiment, the key store objects and the trust store objects are managed by the servlet container that manages the associated server application. Note that the key store objects and the trust store objects do not need to be files, and can be embodied as persistent objects.

In one embodiment, the key store objects and the trust store objects are added by the servlet container to the application context attributes. The key store objects and the trust store objects are accessed through the application context by the on-card server application. Thus, no modification to the servlet's application programming interface (API) is required. The application context is the root of persistence, and the key store objects as well as the trust store objects persist until the application context is destroyed. Note that these certificates and keys are not passed as initialization parameters.

During the deployment, the servlet container allocates a free TCP/IP port, e.g., an application-specific secure port, and spawns a new port listener to handle inbound secure connections to the deployed on-card server application.

The servlet container adds the application-context root uniform resource identifier (URI), e.g. /purse, and the newly allocated port identifier to the redirection map. The redirection map contains the application-context root URI and port mapping for all the applications deployed on the resource-constrained device. For example, one entry in the redirection map for an on-card application "purse" and associated application-specific secure port 30000 is: /purse=> port 30000.

The listener for the default port uses the redirection map to look up the application-specific secure port for a application indicated in the uniform resource locator (URL) of an HTTP(S) request. The listener performs a HTTP redirect of the HTTP(S) request to the application-specific secure port identified in the redirection map. When an application is undeployed, the corresponding entry in the redirection map is removed.

The embodiments described above are illustrative only and are not intended to limit the invention to the specific embodiments described. In view of this disclosure, one of skill in the art can achieve the secure application specific connection in a variety of ways. For example, the invention is not limited to the HTTPS (HTTP over SSL/TLS) protocol.

Other protocols could be used such as S-HTTP. Similarly, applications other than servlet-based applications can be used. The methods are valid for any system dispatching requests received over (secure) connections to applications based on an application identifier where the dispatching decision is based on information encapsulated in the request itself and for which end-to-end secure communications must be established on a per-application basis.

Further, in the above embodiments, certificates and asymmetric cryptography (private key and public key) were described. However, other security tokens/credentials can be used. Several types of credentials can be supported as supported by SSL and TLS including: private keys and public key certificates; and shared secret keys. Also, the packaging of applications, as described above, is just one of many possible ways of provisioning the credentials. Examples of ways of provisioning the credentials include deploying the credential along with the application; credentials specified via deployment parameters; and independently provisioned credentials in a different trusted application on the resource-constrained device.

Figure 4:
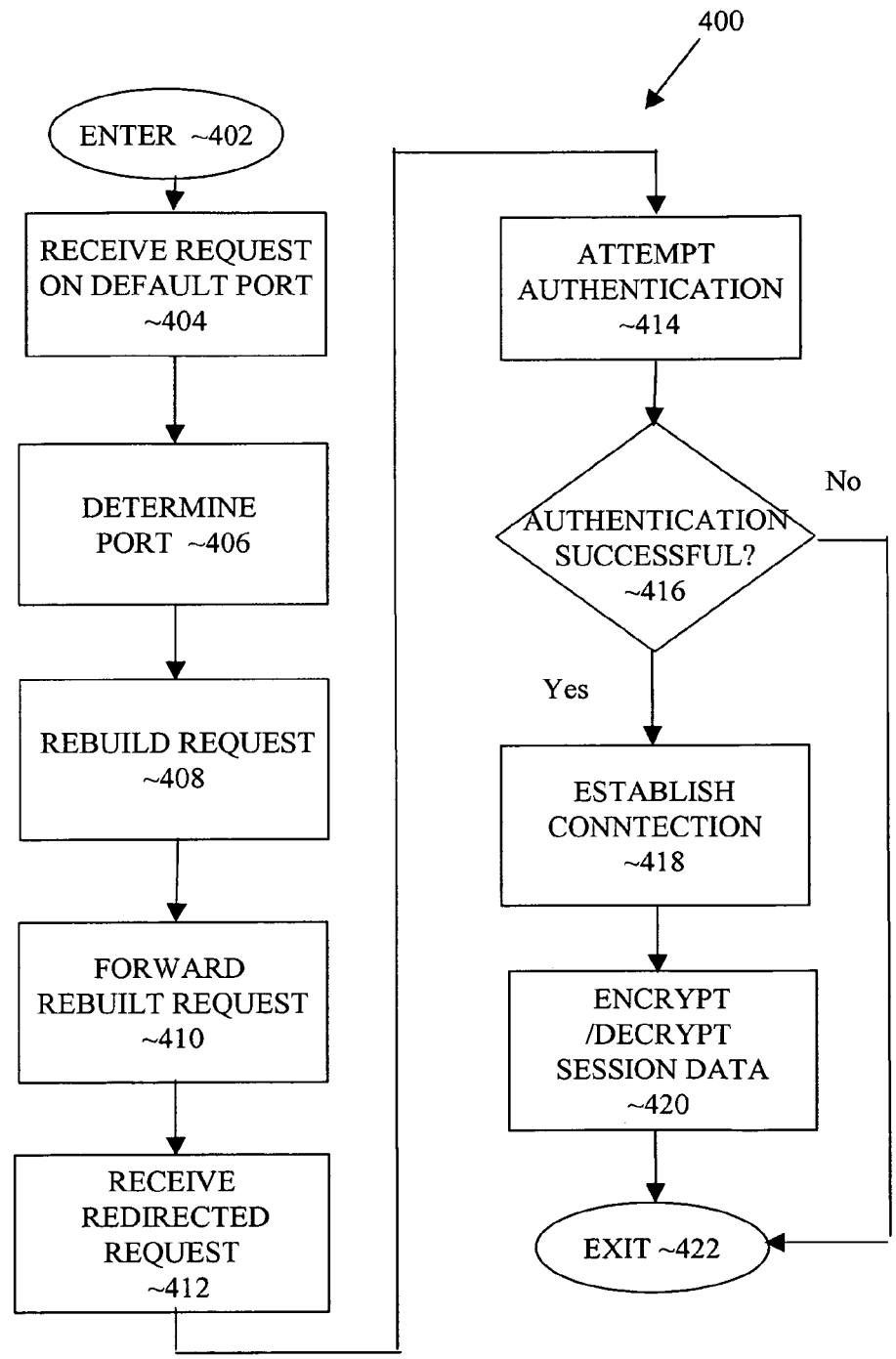
FIG. 4 illustrates a method for secure application-specific communications between a client application executing on a client device and an application executing on a resource-constrained device, according to one embodiment of the present invention.

FIG. 4 is a process flow diagram of a method 400 for secure communications with an application on a resource-constrained device. From an ENTER OPERATION 402, processing moves to a RECEIVE REQUEST ON DEFAULT PORT OPERATION 404.

In RECEIVE REQUEST ON DEFAULT PORT OPERATION 404, an initial request is received on a default port of a resource-constrained device, as previously described. The request, for example, is received from a client application executing on a client device, and targets an on-card application, e.g., a server application, of the resource-constrained device.

From RECEIVE REQUEST ON DEFAULT PORT OPERATION 404, processing moves to a DETERMINE PORT OPERATION 406. In DETERMINE PORT OPERATION 406, the port identifier of an application-specific secure port associated with the targeted server application is determined. For example, a redirection map entry having an application identifier of the targeted server application is looked up to ascertain the corresponding port identifier.

From DETERMINE PORT IDENTIFIER OPERATION 406, processing moves to a REBUILD REQUEST OPERATION 408. In REBUILD REQUEST OPERATION 408, the initial request received in RECEIVE REQUEST ON DEFAULT PORT OPERATION 404 is rebuilt into a rebuilt request that includes the application-specific secure port identifier determined in DETERMINE PORT IDENTIFIER OPERATION 406.

From REBUILD REQUEST OPERATION 408, processing moves to a FORWARD REBUILT REQUEST OPERATION 410. In FORWARD REBUILT REQUEST OPERATION 410, the rebuilt request of the REBUILD REQUEST OPERATION 408 is sent to the client device that sent the initial request, e.g., the rebuilt request is forwarded to the client application.

From FORWARD REBUILT REQUEST OPERATION 410, processing moves to a RECEIVE REDIRECTED REQUEST OPERATION 412. In RECEIVE REDIRECTED REQUEST OPERATION 412, a redirected request is received on the application-specific secure port associated with the server application referenced in the rebuilt request. For example, the client application generates a redirected request referencing the port number of the application-specific secure port included in the rebuilt request.

From RECEIVE REDIRECTED REQUEST OPERATION 412, processing moves to an ATTEMPT AUTHENTICATION OPERATION 414. In ATTEMPT AUTHENTICATION OPERATION 414, authentication is attempted at least on behalf of the targeted server application, or both the targeted server application and the client application. For example, a server public key certificate from a keystore of the targeted application is forwarded to the client and used to authenticate the server application. The trusted client public key certificate from a trust store of the targeted application is used to authenticate the client application.

From ATTEMPT AUTHENTICATION OPERATION 414, processing moves to an AUTHENTICATION SUCCESSFUL CHECK OPERATION 416. In AUTHENTICATION SUCCESSFUL CHECK OPERATION 416, a determination is made whether the authentication attempt in ATTEMPT AUTHENTICATION OPERATION 414 was successful.

Upon a determination in AUTHENTICATION SUCCESSFUL CHECK OPERATION 416 that the authentication attempt was unsuccessful, processing exits in an EXIT OPERATION 422. A secure connection to the targeted server application is not established.

Upon a determination in AUTHENTICATION SUCCESSFUL CHECK OPERATION 416 that the authentication attempt was successful, processing moves from AUTHENTICATION SUCCESSFUL CHECK OPERATION 416 to an ESTABLISH SESSION OPERATION 418. In ESTABLISH CONNECTION 418, a secure connection between the client application and the targeted server application secure port is established. For example, an SSL (TLS) layer resident on the resource-constrained device within the JCRE context is used to negotiate the security parameters for the session and facilitate exchange of algorithms and other security mechanisms for use in the session.

From ESTABLISH CONNECTION OPERATION 418, processing moves to an ENCRYPT/DECRYPT SESSION DATA OPERATION 420. In ENCRYPT/DECRYPT SESSION DATA. OPERATION 420, session data communicated over the secure connection established in ESTABLISH CONNECTION 418 are encrypted and decrypted. For example, the SSL (TLS) layer is used to encrypt/decrypt session data on behalf of the server application.

From ENCRYPT/DECRYPT SESSION DATA OPERATION 420, processing exits in EXIT OPERATION 422.

Those skilled in the art readily recognize that in this embodiment the individual operations mentioned before in connection with secure sockets layer for method 400 are performed by executing computer program instructions on a processor (not shown) of resource-constrained device 200A. In one embodiment, a storage medium (not shown) has thereon installed computer-readable program code for method 400, and execution of the computer-readable program code causes the processor of resource-constrained device 200A to perform the individual operations explained above.

Herein, a computer program product comprises a medium configured to store computer readable code for method 400 or in which computer readable code for method 400 is stored. Some examples of computer program products are CD-ROM discs, ROM cards, floppy discs, magnetic tapes, flash memory, computer hard drives, and servers on a network. Some examples of tangible computer program products are CD-ROM discs, DVD discs, ROM cards, floppy discs, magnetic tapes, flash memory, computer hard drives and servers on a network.

In view of this disclosure, method 400 can be implemented in a wide variety of computer system configurations using an operating system and computer programming language of interest to the user. In addition, method 400 could be stored as different modules in memories of different devices. For example, method 400 could initially be stored in a server computer, and then as necessary, a module of method 400 could be transferred to resource-constrained device 200A and executed on resource-constrained device 200A. Consequently, part of method 400 would be executed on the server processor, and another part of method 400 would be executed on a processor of a client.

In yet another embodiment, method 400 is stored in a memory (not shown) of another computer system. Stored method 400 is transferred over a network to memory (not shown) in resource-constrained device 200A.

Method 400 is implemented, in one embodiment, using a computer program. The computer program may be stored on any common data carrier like, for example, a floppy disk or a compact disc (CD), as well as on any common computer system's storage facilities like hard disks. Therefore, one embodiment of the present invention also relates to a data carrier for storing a computer program for carrying out the inventive method. Another embodiment of the present invention also relates to a method for using a computer system such as resource-constrained device 200A for carrying out method 400. Still another embodiment of the present invention relates to a computer system with a storage medium on which a computer program for carrying out method 400 is stored.

While method 400 has been explained previously in connection with one embodiment thereof, those skilled in the art will readily recognize that modifications can be made to this embodiment without departing from the spirit and scope of the present invention.

What is claimed is:

1. A method, implemented in a resource-constrained device, comprising:
providing, at the resource-constrained device, an application container which includes a plurality of server applications executing therein, wherein each server application
executes within its own application context,
is capable of conducting transactions with client applications executing on a remote device, and
includes within its application context one or more security tokens specific to that server application, for use by the client applications with that server application;
providing one or more application firewalls, which restrict the application context and the security tokens specific to each server application from use by others of the server applications;
providing a physical interconnect layer which is configured to allow the client applications to make requests to the server applications within the application container;
during deployment of each server application to the resource-constrained device,
dynamically allocating a secure port and a virtual host associated with that server application, which receives requests directed to that server application, and
adding an application-context root uniform resource identifier and an identifier for the newly allocated port to a redirection map;
providing a secure port redirector within the application container and coupled to a default port which receives the requests via the physical interconnect layer, wherein the secure port redirector
listens on the default port for an incoming request directed to a particular server application,
determines, using the redirection map, the secure port associated with the virtual host for that particular server application, and
rebuilds the incoming request to form a rebuilt request that includes an identifier for the secure port associated with the virtual host for that particular server application;
receiving, at a security layer which executes within the application contexts of the server applications, a rebuilt request, from the client application executing on the client device, directed to the particular server application; and
using the security tokens that are specific to the particular server application to
authenticate the client application that initially sent the request, and
establish an application-specific secure connection between the client application and the server application for conducting a transaction.

2. The method of claim 1 further comprising:
allocating dynamically to each of the server applications an application-specific secure port upon deployment of that server application on the resource-constrained device, such that a same application deployed on different resource-constrained devices can be associated with a different application-specific secure port on each of the different resource-constrained devices.

3. The method of claim 2 further comprising:
for each of the server applications, spawning a new port listener, wherein the new port listener listens on the application-specific secure port for that server application.

4. The method of claim 1 further comprising:
redirecting said executing client application to said secure-application specific port.

5. The method of claim 1 further comprising:
wherein the secure port director determines the secure port by accessing the redirection map on said resource-constrained device, in response to receiving a Hypertext Transfer Protocol (HTTP) request by said executing client application, and looking up a secure port as indicated by a uniform resource locator (URL) of the request.

6. The method of claim 1 wherein said transport security layer is a secure sockets layer.

7. The method of claim 1 further comprising:
deploying an application bundle onto the resource-constrained device.

8. The computer-implemented method of claim 7, wherein the application bundle comprises:
the server application;
at least one trusted client public key certificate for deployment in the application context of the server application; and
a private key for said server application wherein said security token includes at least said private key.

9. A resource-constrained device, comprising:
an application container, which includes a plurality of server applications executing therein, wherein each server application
executes within its own application context,
is capable of conducting transactions with client applications executing on a remote device, and
includes within its application context one or more security tokens specific to that server application, for use by the client applications with that server application;
one or more application firewalls, which restrict the application context and the security tokens specific to each server application from use by others of the server applications;
a plurality of virtual hosts, wherein, during deployment of each server application to the resource-constrained device, the resource-constrained device dynamically allocates a secure port and a virtual host associated with that server application, which receives requests directed to that server application, and adds an application-context root uniform resource identifier and an identifier for the newly allocated port to a redirection map;
a physical interconnect layer which is configured to allow the client applications to make requests to the server applications within the application container;
a secure port redirector provided within the application container and coupled to a default port which receives the requests via the physical interconnect layer, wherein the secure port redirector
listens on the default port for an incoming request directed to a particular server application,
determines, using the redirection map, the secure port associated with the virtual host for that particular server application, and
rebuilds the incoming request to form a rebuilt request that includes an identifier for the secure port associated with the virtual host for that particular server application; and
a security layer which executes within the application contexts of the server applications, wherein upon receiving a rebuilt request directed to a particular server application, the security layer uses the security tokens that are specific to the particular server application to
authenticate the client application that initially sent the request, and
establish an application-specific secure connection between the client application and the server application for conducting the transaction.

10. The resource-constrained device of claim 9 further comprising:
a trust store object in said application context, wherein the trust store object includes a security token for said client application and further wherein said security token is used in said authentication.

11. The resource-constrained device of claim 9 further comprising:
a key store object in said application context, wherein the key store object includes said security token for said server application.

12. The resource-constrained device of claim 9 further comprising:
a redirection map, coupled to said secure port redirector, comprising at least one entry including:
an application identifier identifying the server application; and
a port identified identifying the application-specific secure port.

13. The resource-constrained device of claim 10 further comprising:
a virtual host listening on said secure port.

14. A tangible computer product having stored thereon computer-readable instructions, which when executed by a resource-constrained device generates a method comprising:
providing, at the resource-constrained device, an application container which includes a plurality of server applications executing therein, wherein each server application
executes within its own application context,
is capable of conducting transactions with client applications executing on a remote device, and
includes within its application context one or more security tokens specific to that server application, for use by the client applications with that server application;
providing one or more application firewalls, which restrict the application context and the security tokens specific to each server application from use by others of the server applications;
providing a physical interconnect layer which is configured to allow the client applications to make requests to the server applications within the application container;
during deployment of each server application to the resource-constrained device,
dynamically allocating a secure port and a virtual host associated with that server application, which receives requests directed to that server application, and
adding an application-context root uniform resource identifier and an identifier for the newly allocated port to a redirection map;
providing a secure port redirector within the application container and coupled to a default port which receives the requests via the physical interconnect layer, wherein the secure port redirector
listens on the default port for an incoming request directed to a particular server application,
determines, using the redirection map, the secure port associated with the virtual host for that particular server application, and rebuilds the incoming request to form a rebuilt request that includes an identifier for the secure port associated with the virtual host for that particular server application;

receiving, at a security layer which executes within the application contexts of the server applications, a rebuilt request, from the client application executing on the client device, directed to the particular server application; and using the security tokens are specific to that the particular server application to
- authenticate the client application that initially sent the request, and
- establish an application-specific secure connection between the client application and the server application for conducting a transaction.

15. The computer-program product of claim 14, wherein said method further comprises:

allocating dynamically to each of the server applications an application-specific secure port upon deployment of that server application on the resource-constrained device, such that a same application deployed on different resource-constrained devices can be associated with a different application-specific secure port on each of the different resource-constrained devices.

16. The resource-constrained device of claim 9, wherein the device allocates dynamically to each of the server applications an application-specific secure port upon deployment of that server application on the resource-constrained device.

17. The resource-constrained device of claim 16, wherein upon deployment of the server applications on the resource-constrained device, each of the server applications are allocated a unique application-specific secure port.

18. The method of claim 2, wherein upon deployment of that server applications on the resource-constrained device, each of the server applications are allocated a unique application-specific secure port.

19. The computer-program product of claim 14, wherein upon deployment of the server applications on the resource-constrained device, each of the server applications are allocated a unique application-specific secure port.

* * * * *